United States Patent [19]

Jones, Jr.

[11] 3,865,045

[45] Feb. 11, 1975

[54] RAILWAY VEHICLE TRUCK WITH DEVICE FOR DAMPING OSCILLATIONS ABOUT SWIVEL AXIS

[75] Inventor: William Clifford Jones, Jr., Granite City, Ill.

[73] Assignee: General Steel Industries, Inc., St. Louis, Mo.

[22] Filed: Apr. 25, 1974

[21] Appl. No.: 464,113

[52] U.S. Cl............................................ 105/199 C
[51] Int. Cl............................................... B61f 3/00
[58] Field of Search . 105/182, 191, 199 C, 199 CB, 105/199 A, 199 R

[56] References Cited
UNITED STATES PATENTS

| | | | |
|---|---|---|---|
| 3,020,857 | 2/1962 | Dean............................ | 105/199 R |
| 3,636,885 | 1/1972 | Cunningham................ | 105/199 R X |
| 3,704,670 | 12/1972 | Dobson et al................ | 105/199 R X |
| 3,709,151 | 1/1973 | Cook............................ | 105/199 C |

Primary Examiner—M. Henson Wood, Jr.
Assistant Examiner—John J. Love
Attorney, Agent, or Firm—F. Travers Burgess

[57] ABSTRACT

Means for supplementing the resistance of railway truck friction central bearings to objectionable oscillation of the trucks about their swivel axes under light load conditions comprise a snubber connected to the car underframe and mounted for operative engagement with a truck part when the car is unloaded and for disengagement therefrom when the car is loaded.

10 Claims, 7 Drawing Figures

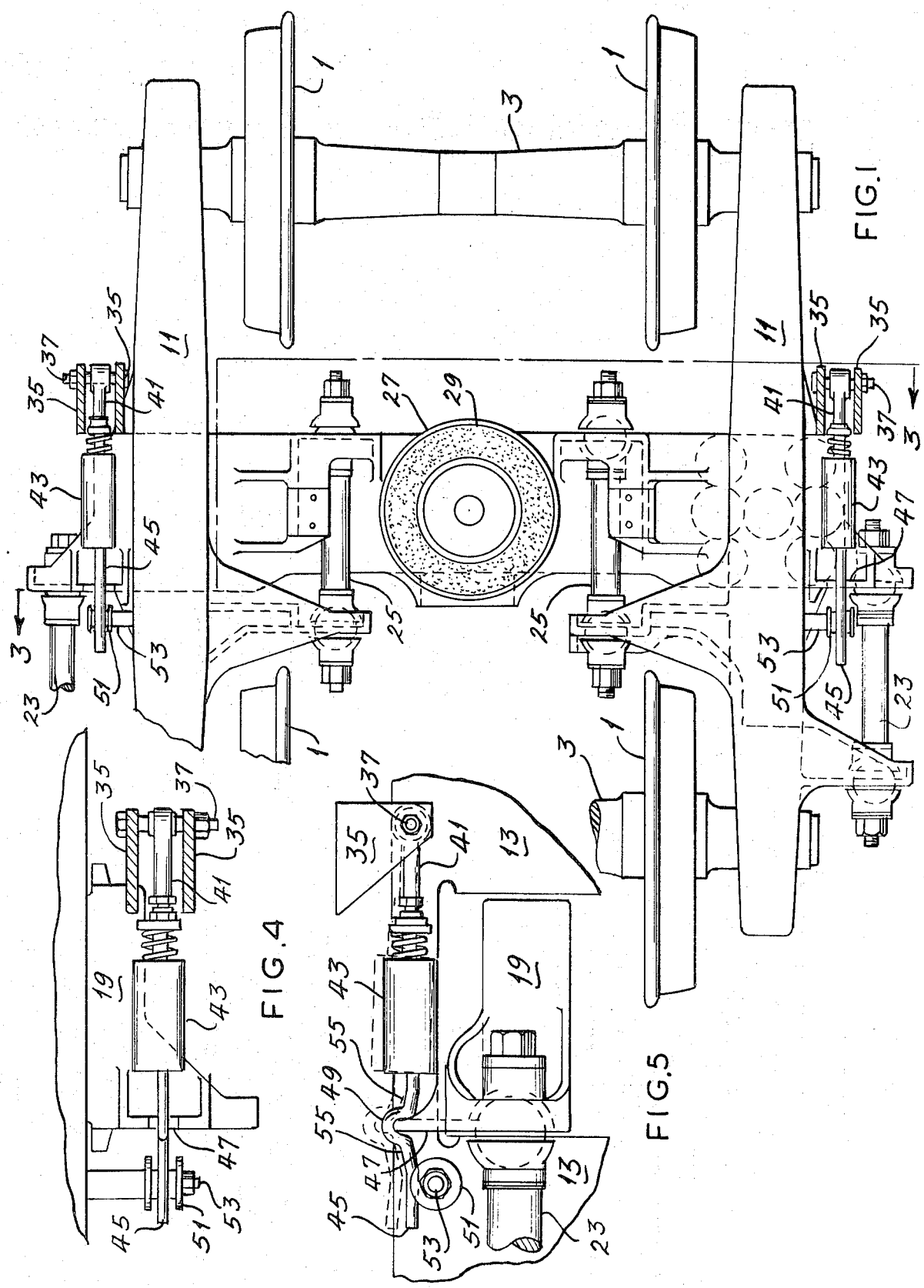

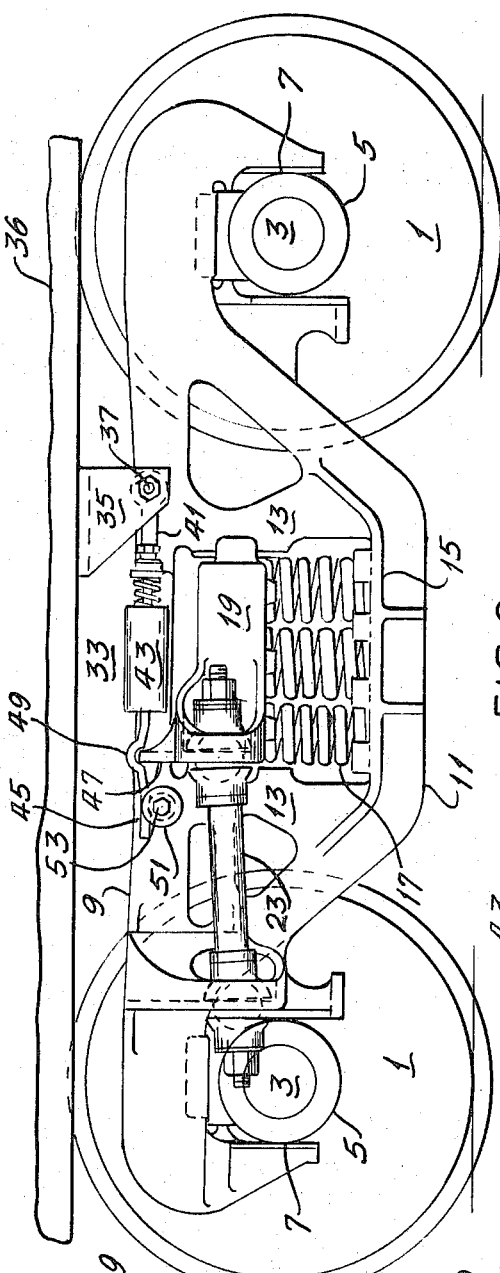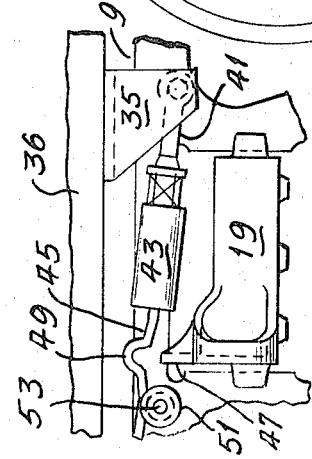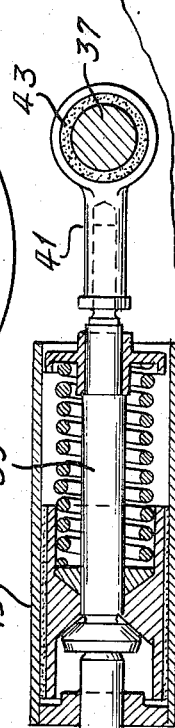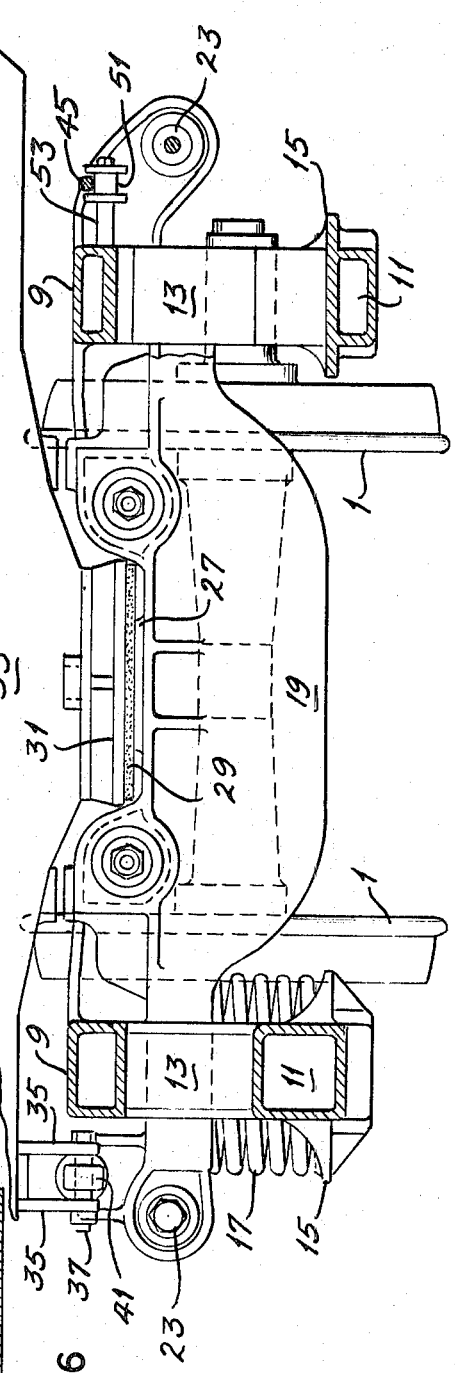

3,865,045

RAILWAY VEHICLE TRUCK WITH DEVICE FOR DAMPING OSCILLATIONS ABOUT SWIVEL AXIS

BACKGROUND OF THE INVENTION

1. Field of the Invention

The invention relates to railway rolling stock and consists particularly in means for damping oscillatory movements of a swivel truck about its swivel axis.

2. The Prior Art

For damping objectionable oscillations, or shimmy, of railway trucks about their swivel axes central bearings of the type disclosed in J. C. Travilla U.S. Pat. No. 2,655,117 have been used with great success, particularly in passenger cars where the variation between light weight and fully loaded weight is not substantial. On many types of freight cars, such as ore and hopper cars, the lading may weigh over 100 tons, causing a variation of over 50 tons load on each truck between light and loaded condition. In such cases, a friction central bearing designed to dampen such objectionable oscillations under loaded conditions would not offer sufficient resistance under light or no-load conditions to dampen truck shimmy.

SUMMARY OF THE INVENTION

The invention provides, in a railway swivel truck, means for providing sufficient frictional resistance to prevent truck shimmy when the supported car is operating light and frictional resistance offered by the central bearing is insufficient because of the reduced load on the central bearing. It is accordingly an object of the invention to provide a device supplemental to a friction central bearing for automatically providing frictional resistance to truck shimmy under light and no-load operating conditions. It is an object of the invention to provide a simple, inexpensive device to this end, easily applicable to a car and requiring no substantial modification of the car body or truck structure. A further object is to make the operation of the device directly responsive to static changes in spring height.

BRIEF DESCRIPTION OF THE DRAWINGS

FIG. 1 is a partial plan view of a truck embodying the invention.

FIG. 2 is a side elevational view of the truck illustrated in FIG. 1, showing a portion of the supported car body under light car condition.

FIG. 2A is a fragmentary side elevational view of the truck illustrated in FIGS. 1 and 2, showing the bolster end and car body in loaded car condition.

FIG. 3 is a transverse vertical sectional view along line 3—3 of FIG. 1.

FIGS. 4 and 5 are, respectively, enlarged top and side views of the variable damping device, showing immediately adjacent portions of the truck.

FIG. 6 is an enlarged longitudinal vertical sectional view of the friction snubbing device.

DETAILED DESCRIPTION OF THE INVENTION

The numeral 1 denotes flanged railway wheels mounted in transversely gauged pairs on longitudinally spaced railway axles 3, the ends of which are rotatably received in bearings 5.

Transversely spaced longitudinally extending side frames are formed at their ends with downwardly open pedestal jaws 7 and include top and bottom chords 9 and 11, connected and spaced apart intermediate their ends by longitudinally spaced vertical columns 13 to form a central generally rectangular window. The top of bottom chord 11 is widened at 15 to form a spring seat, and upright coil springs 17 are seated thereon.

A transversely extending bolster 19 has end portions protruding through the side frame window between columns 13 and resting on springs 17.

For accommodating vertical and lateral movements of the bolster on springs 17, bolster 19 may be connected to each side frame by parallel longitudinally extending anchor devices 23 and 25 positioned, respectively, outboard and inboard of the side frames, in accordance with J. C. Travilla U.S. Pat. No. 3,254,611.

At its center bolster 19 mounts an upwardly facing pivot central bearing 27 incorporating a horizontal annular pad 29 of friction material and a downwardly facing mating central bearing 31, mounted on car body bolster 33, rotatably rests on pad 29.

Under loaded car conditions, the frictional resistance provided by pad 29 prevents objectionable oscillation of the truck about its swivel axis while permitting normal swivel movements of the truck necessitated by track curvature.

Under light car conditions, the frictional resistance provided by pad 29 is substantially reduced by reason of the reduction of the body load applied to the pad.

In order to compensate for this reduction in frictional resistance under light car conditions, and thereby provide sufficient frictional resistance to prevent objectionable oscillations of the truck about its swivel axis, brackets each comprising a pair of transversely spaced vertical plates 35 are secured to the bottom of car body 36 transversely outboard of side frames 11 and near one of the side frame columns 13.

A transverse bolt 37 extends through the lower extremities of each pair of bracket plates 35 and the plunger 39 of a friction snubbing device is pivotally connected to bolt 37 by an eye member 41, preferably containing an elastomeric bushing 41 to eliminate metal-to-metal contact and consequent wear between the eye member and bolt 37.

The cylinder 43 of each snubbing device which extends longitudinally of the truck, i.e., tangentially with respect to the swivel axis, is provided with a rod 45 fixed to its closed end and extending longitudinally therefrom so that forces tending to move rod 45 axially with respect to car body brackets 35 and bolt 37 will be frictionally resisted by the snubbing means.

The end portions of bolster 19 protruding outwardly from side frames 11 are formed with upstanding plate-like abutments 47 transverse of the snubber rods and each snubber rod 45 is formed with an upward offset 49 receiving the adjacent abutment 47 when the car is light and the body and bolster are at the heights shown in FIG. 2. Under such conditions any tendencies of the truck to oscillate will be resisted, in addition to the reduced resistance offered by the central bearing friction pad 29, by the resistance offered by snubbing device 41, 43, 45 to changes in the distance from rod offset 49 to bolt 37.

In order to effect disengagement of each snubber rod offset 49 and the cooperating bolster abutment 47 when the car is loaded, and the body 36 and bolster 19 drop, through compression of springs 17 to the level shown in FIG. 2A, double flanged rollers 51 are journaled on stud 53 projecting outwardly from the respective side frame top chord 9, and underlyingly engage the end portion of rod 45, holding it at the normal light car level, so that when the car is loaded, and central bearing friction pad 29 is thus supplying sufficient frictional resistance to oppose oscillation of the truck about its swivel axis, no frictional resistance will be added by snubbing device 41, 43, 45.

In order to facilitate reengagement of offset 49 with bolster abutment 47 when the car is unloaded, bar 45 is slightly bent upwardly toward offset 49 at 55 on both ends of offset 49, as most clearly seen in FIG. 5.

Operation of the invention is as follows: When the car is moving in light condition, the height of springs 17 is as shown in FIG. 2 and bolster 19 and body 36 are at correspondingly high levels, so that offsets 49 in snubber rods 45 engage bolster brackets 47. Any tendencies of the truck to oscillate about its swivel axis are opposed by the aggregate frictional resistance offered by the central bearing pad 29 and snubbing devices 41, 43, 45, 49, the latter compensating for the reduced resistance offered by pad 29 by reason of the lighter load on pad 29.

When the car is fully loaded, springs 17 are compressed, permitting bolster 19 and body 36 to drop to the level shown in FIG. 2A with respect to the truck side frames. Side frame mounted roller 51, because of its underlying engagement with snubber rod 45, prevents the latter from dropping to the same level and thus causes disengagement of the snubber rod offset 49 from bolster abutment 47. While the car is moving in this condition, the heavy load on central bearing friction pad 29 provides sufficient frictional resistance to prevent objectionable truck oscillation about its swivel axis, and no resistance is provided by snubbing devices 41, 43, 45, 49.

When the car is unloaded, and bolster 19 returns to its light car level (FIG. 2), the slopes 55 in snubber rod 45 will help bolster abutment 47 to enter rod offset 49.

It will be understood that either one or two of the snubbing devices can be used on a truck, preferably the latter, one at each side as shown, to provide for symmetrical application of the snubbing forces to the bolster and to permit the use of lower capacity individual snubbing devices.

The details of the invention may be varied substantially without departing from the spirit of the invention and the exclusive use of such modifications as come within the scope of the appended claims is contemplated.

I claim:

1. In a railway vehicle, a swivel truck comprising wheeled axles spring supporting structure carried by said axles, springs supported on said spring supporting structure, spring supported structure carried on said springs, said spring supported structure having an upwardly facing friction central bearing part, vehicle body structure having a downwardly facing swivel central bearing part in mating pivotal load supporting engagement with said spring supported structure part, a snubbing device extending tangentially with respect to the truck swivel axis and having relatively movable ends, one of its ends being attached to said body structure and its other end portion being engaged with said spring supported structure when said body structure is loaded below a predetermined value, and means on said spring supporting structure engageable with said snubbing device for disengaging the latter from said spring supported structure when said load exceeds said predetermined value.

2. In a railway vehicle according to claim 1, said snubbing device other end portion being formed with an upward offset and said spring supported structure having an upstanding abutment received within said offset only when said load is below a predetermined value.

3. In a railway vehicle according to claim 2, said disengaging means comprising an element on said spring supporting structure in underlying relation with said snubbing device other end portion and positioned to uphold the latter clear of said abutment when said body and said spring supported structure are lowered through compression of said springs by a load in excess of said predetermined value.

4. In a railway vehicle according to claim 3, said disengaging element comprising a roller journaled on said spring supporting element whereby to freely accommodate movements of said snubbing device end portion tangential with respect to the truck swivel axis during swivel movements of the truck.

5. In a railway vehicle according to claim 1, a pair of said snubbing devices disposed symmetrically with respect to the truck swivel axis.

6. In a railway vehicle according to claim 1, said spring supporting structure comprising frame means, said spring supported structure comprising a transverse bolster.

7. In a railway vehicle truck according to claim 6, said frame means comprising separate longitudinally extending side frames.

8. In a railway vehicle truck according to claim 7, said snubbing device other end portion being formed with an upward offset and said bolster having an upstanding abutment received within said offset only when said load is below a predetermined value.

9. In a railway vehicle truck according to claim 8, said disengaging means comprising an element on one of said side frames in underlying relation with said snubbing device other end portion and positioned to uphold the latter clear of said abutment when said body and said bolster are lowered through compression of said springs by a load in excess of said predetermined value.

10. In a railway vehicle according to claim 9, said disengaging element comprising a roller journaled on said one side frame whereby to freely accommodate movements of said snubbing device end portion tangential with respect to the truck swivel axis during swivel movements of the truck.

* * * * *